Feb. 15, 1927.
H. HORN
1,617,520
APPARATUS FOR COMMINUTING PASTY AND LIQUID MATERIALS
Filed June 5, 1926
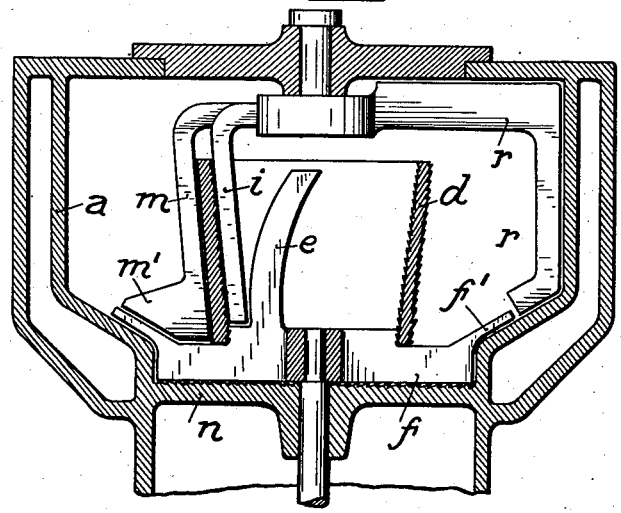
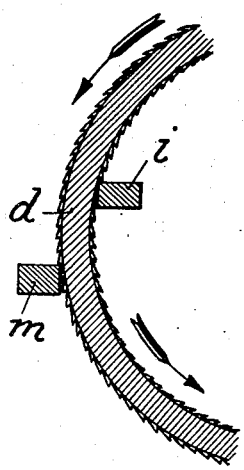
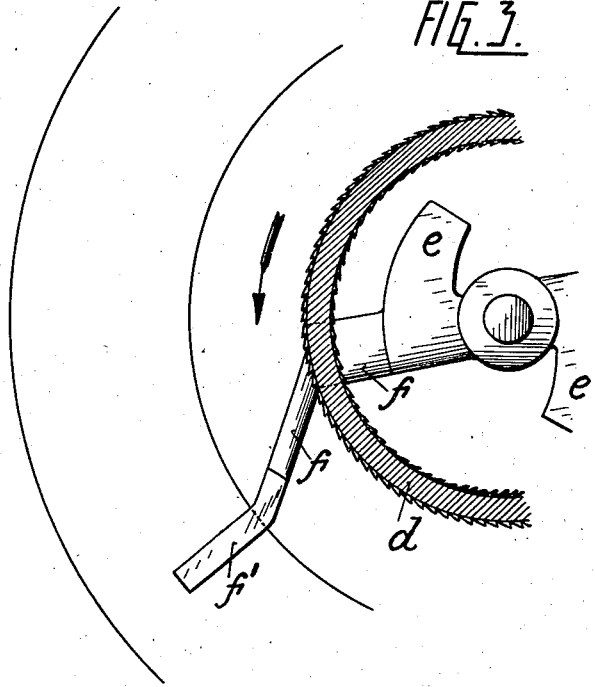
Inventor:
H. Horn
by Marks & Clark
Attys.

Patented Feb. 15, 1927.

1,617,520

UNITED STATES PATENT OFFICE.

HEINRICH HORN, OF FREITAL-DOHLEN, NEAR DRESDEN, GERMANY.

APPARATUS FOR COMMINUTING PASTY AND LIQUID MATERIALS.

Application filed June 5, 1926, Serial No. 113,942, and in Germany April 17, 1926.

This invention relates to such apparatus for comminuting pasty and liquid materials, more particularly cocoa and chocolate masses, in which inside a pan for holding the material and capable of being heated and cooled a centrifugal conveyor rotates, which causes the mass to rotate, sucking it in on one side and ejecting it on the other, so that there is a continuous and vigorous stirring up of the mass and a mutual rubbing down of the particles.

On the under side of the centrifugal conveyor ribs are provided, which sweep over the bottom of the pan at a short distance from the same. Strippers are provided inside and outside at the edge of the centrifugal conveyor, so that between them and the walls of the centrifugal conveyor and between the ribs on the bottom of the conveyor and the bottom of the pan there are narrow gaps, through which the particles of the material are driven at a high speed, which greatly assists the comminution of the material. According to the present invention the bottom of the pan for containing the material, over which the ribs on the bottom of the centrifugal conveyor sweep, is made flat and has a rough surface, the body of the centrifugal conveyor being also roughened inside and outside. By this arrangement the bottom of the pan prevents the layer of material in immediate contact with it from being caused to rotate by the centrifugal conveyor and the centrifugal conveyor is rendered more capable of carrying along with it the layers of material in immediate contact with its walls, whereby the particles are thrown with great force against the internal and external strippers and are forced through the narrow gaps. The roughened bottom of the pan holds the particles back, so that they can be acted on more thoroughly by the ribs at the bottom of the centrifugal conveyor and the mutual grinding action is increased. It has been found that by this means the comminuting action is very considerably increased and accelerated. According to the invention the stripper provided on the outside of the centrifugal conveyor extends to the ribs on the under side of the conveyor, which have outwardly directed extensions following the contour of the wall of the pan, without making contact with it, to which extensions there correspond similar lateral extensions of the outer strippers which are at a short distance above the same. The inner and outer strippers may be located one behind the other in the direction of rotation of the conveyor and have an angular cross-section. They are parallel to a radius of the body of the centrifugal conveyor, so that the sharp edges lying close to the walls of the latter act as very efficient beating edges. In order that there shall be a certain amount of give between the strippers and the body of the centrifugal conveyor, the strippers are fixed to a scraper which travels along the wall of the pan and is rotatable about the axis of the conveyor. The scraper which travels along the wall of the pan owing to its rotary motion keeps the said wall clean, and allows the scrapers to rotate with the centrifugal conveyor continuously at a certain velocity. The arrangement is however capable of yielding to any greater resistance between the centrifugal conveyor and the strippers, so that there is no fear of the arrangement being damaged, even if hard bodies should get into the gap between the strippers and the centrifugal member. The extensions on the ribs at the under side of the centrifugal member pass with a slight clearance between the wall of the pan and the extension of the outer scraper and thereby exert a strong beating action on the particles of material, which come in contact with them, the efficiency being thus still further increased and the time taken for the operation being decreased.

In the accompanying drawing a constructional example of the invention is shown, Figure 1 being a vertical axial section through the apparatus, Figure 2 showing a portion of a centrifugal member to an enlarged scale with the strippers in cross-section and Figure 3 a cross-section through the lower part of the centrifugal member with the ribs at the bottom of the same, which sweep over the roughened bottom of the pan.

The pan $a$ has a flat bottom $n$ having a roughened surface. In the pan there rotates the centrifugal conveyor $d$, the walls of which are also roughened inside and outside. The ribs $f$ at the bottom of the centrifugal member form an extension of the inner conveying ribs $e$ and are bent over in the usual manner in the direction of rotation of the centrifugal member, so as to draw the material in. In accordance with the present invention the bottom ribs are provided with extensions $f'$, which, as shown in Figure 3, may be bent radially and follow the contour of the wall of the pan (Fig. 1). To the extensions $f'$ there corresponds an extension $m'$ on the outer stripper $m$ of the centrifugal conveyor, the extension $m'$ being immediately above the extensions $f'$, leaving only a narrow gap between the former and the latter and the adjacent parts of the ribs $f$. The strippers $m$ and $i$ are arranged so as to follow one another in the direction of rotation of the centrifugal conveyor (Fig. 2), and have the longitudinal sides of their cross-section parallel to the radius of the centrifugal member so that the edges lying close to the walls of the centrifugal member provide effective beating edges.

The strippers $m$ and $i$ may be stationary. It is preferable however to make them capable of rotating and to provide them with braking means. A simple brake of this kind is formed by a stripper $r$ which is connected rigidly to the strippers $m$ and $i$ and sweeps along the cover and the wall of the pan, keeping them clean. The stripper $r$ will in most cases act as a sufficient resistance, strippers $m$ and $i$ turning with the centrifugal conveyor. In exceptional cases a separate braking device may be provided, which acts on the shaft of the strippers and the action of which is made regulable. This rotary part of the apparatus can easily yield to greater resistance, caused, for instance, by hard bodies entering the gap between the strippers and the centrifugal member, so that any serious damage cannot occur.

What I claim is:—

1. An apparatus for comminuting pasty and liquid materials, comprising in combination a pan having a flat bottom with a roughened inside surface for the reception of the material to be treated, means for heating and cooling the said pan, a centrifugal conveying member capable of rotating in the said pan and having a roughened inside and outside surface and ribs at its bottom capable of sweeping over the bottom of the pan at a small distance from it and having outwardly directed extensions following the contour of the wall of the pan without touching the same, and strippers inside and outside the centrifugal member in close proximity to the walls of the same, the outer stripper extending as far as the ribs on the bottom of the centrifugal member and having an outwardly directed lateral extension arranged at a short distance above the extensions on the bottom ribs, as and for the purpose set forth.

2. An apparatus for comminuting pasty and liquid materials, comprising in combination a pan having a flat bottom with a roughened inside surface for the reception of the material to be treated, means for heating and cooling the said pan, a centrifugal conveying member capable of rotating in the said pan and having a roughened inside and outside surface and ribs at its bottom capable of sweeping over the bottom of the pan at a small distance from it and having outwardly directed extensions following the contour of the wall of the pan without touching the same, and strippers inside and outside the centrifugal member arranged one behind the other in the direction of rotation of the centrifugal member in close proximity to the walls of the same, the said strippers being substantially rectangular in cross section with the longer sides parallel to a radius of the centrifugal member, the outer stripper extending as far as the ribs on the bottom of the centrifugal member, and having an outwardly directed lateral extension arranged at a short distance above the extensions on the bottom ribs, as and for the purpose set forth.

3. An apparatus as claimed in claim 2 and in which the inside and outside strippers are capable of being rotated about the axis of the centrifugal member and have a stripper ($r$) fixed to them, capable of sweeping along the inside of the wall of the pan, as set forth.

4. An apparatus as claimed in claim 2 and in which the inside and outside strippers are capable of being rotated about the axis of the centrifugal member and have a stripper ($r$) fixed to them, capable of sweeping along the inside of the wall of the pan, in combination with means for braking the said stripper ($r$), as set forth.

In testimony whereof I have signed my name to this specification.

HEINRICH HORN.